United States Patent
Bhalgat

(10) Patent No.: US 10,176,498 B2
(45) Date of Patent: Jan. 8, 2019

(54) PACING A BUDGET FOR PRESENTING SPONSORED CONTENT WHILE LIMITING FREQUENCY OF SPONSORED CONTENT PRESENTATION

(71) Applicant: Facebook, Inc., Menlo Park, CA (US)

(72) Inventor: Anand Sumatilal Bhalgat, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 411 days.

(21) Appl. No.: 14/986,642

(22) Filed: Jan. 1, 2016

(65) Prior Publication Data

US 2017/0193560 A1 Jul. 6, 2017

(51) Int. Cl.
G06Q 30/00 (2012.01)
G06Q 30/02 (2012.01)

(52) U.S. Cl.
CPC ..... G06Q 30/0275 (2013.01); G06Q 30/0246 (2013.01); G06Q 30/0272 (2013.01); G06Q 30/0277 (2013.01)

(58) Field of Classification Search
None
See application file for complete search history.

(56) References Cited

U.S. PATENT DOCUMENTS

| 8,935,247 | B1 * | 1/2015 | Tholome | G06F 17/3071 |
| | | | | 706/16 |
| 2008/0091524 | A1 * | 4/2008 | Yan | G06Q 30/02 |
| | | | | 705/14.45 |
| 2010/0161419 | A1 * | 6/2010 | Tomlin | G06Q 30/02 |
| | | | | 705/14.55 |
| 2010/0293060 | A1 * | 11/2010 | Veach et al. | G06Q 30/02 |
| | | | | 705/14.71 |
| 2010/0318418 | A1 * | 12/2010 | Wertheimer | G06Q 30/02 |
| | | | | 705/14.45 |
| 2013/0138514 | A1 * | 5/2013 | Yan | G06Q 30/0241 |
| | | | | 705/14.71 |
| 2014/0006170 | A1 * | 1/2014 | Collette | G06Q 30/0277 |
| | | | | 705/14.71 |
| 2014/0108145 | A1 * | 4/2014 | Patel | G06Q 30/0257 |
| | | | | 705/14.54 |
| 2014/0136338 | A1 * | 5/2014 | Ringdahl | G06Q 30/0275 |
| | | | | 705/14.71 |

(Continued)

*Primary Examiner* — Matthew T Sittner
(74) *Attorney, Agent, or Firm* — Fenwick & West LLP

(57) ABSTRACT

An advertising campaign received by an online system has a specified budget, a specified duration, and includes multiple advertisement requests that each include advertisements for presentation to users of the online system. An ad request included in the advertising campaign is associated with a frequency limit specifying a maximum number of times an advertisement from the ad request is shown to a user during the specified duration. When selecting advertisements for presentation to a user, the online system determines an adjustment value for the ad request's bid amount based on a number of times the advertisement from the ad request has been presented to the user, an amount of the duration that has lapsed, and the frequency limit associated with the ad request. The online system modifies the ad request's bid amount by the adjustment value and uses the modified bid amount when selecting advertisements for presentation to the user.

12 Claims, 3 Drawing Sheets

(56) References Cited

U.S. PATENT DOCUMENTS

| | | | |
|---|---|---|---|
| 2014/0222802 A1* | 8/2014 | Yan | G06F 17/30554 707/723 |
| 2014/0304086 A1* | 10/2014 | Dasdan | G06Q 30/0275 705/14.71 |
| 2014/0304087 A1* | 10/2014 | Himrod | G06Q 30/0275 705/14.71 |
| 2014/0337143 A1* | 11/2014 | Petersen | G06Q 30/0275 705/14.71 |
| 2014/0358673 A1* | 12/2014 | Sim | G06Q 30/0251 705/14.45 |
| 2014/0365318 A1* | 12/2014 | Karande | G06Q 30/0275 705/14.71 |
| 2014/0365320 A1* | 12/2014 | Kanter | G06Q 30/0277 705/14.73 |
| 2015/0127470 A1* | 5/2015 | Ghosh | G06Q 30/0275 705/14.71 |
| 2015/0154631 A1* | 6/2015 | Umeda | G06Q 30/0243 705/14.42 |
| 2016/0267522 A1* | 9/2016 | Schellenberger | G06Q 30/0244 |
| 2017/0193560 A1* | 7/2017 | Bhalgat | G06Q 30/0275 |

* cited by examiner

PACING A BUDGET FOR PRESENTING SPONSORED CONTENT WHILE LIMITING FREQUENCY OF SPONSORED CONTENT PRESENTATION

BACKGROUND

This disclosure relates generally to presenting content in an online system, and more specifically to pacing of a budget by a user for presenting sponsored content to other users via an online system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow users (e.g., businesses) to sponsor presentation of content on an online system to gain public attention for a user's products or services or to persuade other users to take an action regarding the user's products or services. Content for which the online system receives compensation in exchange for presenting to users is referred to as "sponsored content." Many online systems receive compensation from a user for presenting online system users with certain types of sponsored content provided by the user. Frequently, online systems charge a user for each presentation of sponsored content to an online system user or for each interaction with sponsored content by an online system user. For example, an online system receives compensation from an entity each time a content item provided by the user is displayed to another user on the online system or each time another user is presented with a content item on the online system and interacts with the content item (e.g., selects a link included in the content item), or each time another user performs another action after being presented with the content item (e.g., visits a physical location associated with the user who provided the content item).

When providing sponsored content items to an online system for presentation to users of the online system, a user may provide parameters for limiting presentation of the sponsored content items by the online system. For example, a user specifies a time limit and a budget for the online system to present sponsored content items provided by the user to other users. When the time limit expires, the online system stops presenting the sponsored content items from the user, even if the budget is not exhausted. Similarly, when the budget is exhausted, the online system stops presenting the sponsored content items from the user to other users, even if the time limit specified by the user has not expired. Hence, the advertising campaign may be presented to users either until the budget is exhausted or the time limit expires. Additionally, the user may specify frequency limits for various sponsored content items along with the time limit, with a frequency limit for a sponsored content item specifying a maximum number of times the sponsored content item is presented to another user during the time limit.

However, pacing presentation of sponsored content items received from a user over a time limit specified by the user allows the sponsored content items to be presented to other users for the full duration of the time limit. Because conventional methods for selecting sponsored content for presentation by an online system identify sponsored content items eligible for presentation to another user and determine whether to present the identified sponsored content items, fluctuations in the number of online system users eligible to be presented with sponsored content items provided by a user may affect how rapidly a budget of the advertising campaign is exhausted. Similarly, fluctuations in a number of opportunities to present sponsored content items to a particular online system user affects how rapidly presentation of a sponsored content item from the user to the particular online system user reaches the frequency limit for the sponsored content item. As prediction of the number of opportunities to present sponsored content items to various online system users is difficult to accurately predict before the opportunities are identified and an amount a user is willing to compensate the online system for presenting sponsored content items to other online system users may vary over time, conventional methods for selecting sponsored content items by an online system limit a user's ability to regulate frequencies with which sponsored content items are presented to other users throughout a time interval.

SUMMARY

An online system maintains advertisement requests ("ad requests") in an advertising campaign and identifies one or more ad requests from the ad campaign for inclusion in one or more selection processes when an opportunity to present one or more advertisements to a user of the online system is identified. The advertising campaign includes multiple ad requests and is associated with a budget and a duration. Additionally, various ad requests in the ad campaign are associated with frequency limits, where a frequency limit associated with an ad request specifying a maximum number of times an advertisement from the ad request is presented to a user during the duration of the ad campaign. To allow a frequency limit for an ad request in the advertising campaign to be completed over the duration associated with the advertising campaign, the online system modifies bid amounts associated with the ad request in different selection processes performed when opportunities to present one or more advertisements to a user are identified. The online system modifies a bid amount associated with the ad request in a selection process for an opportunity to present one or more advertisements to a user based on a frequency limit associated with the ad request, a number of times an advertisement in the ad request has previously been presented to the user during the duration of the advertising campaign, and an amount of the duration of the advertising campaign that has lapsed.

In various embodiments, when the online system includes an ad request from the advertising campaign in a selection process selecting content for presentation to a user, the online system determines an adjustment value for a bid amount associated with the ad request based on a frequency limit associated with the ad request. To determine the adjustment value, the online system determines an amount of revenue received by the online system per impression of advertisements to the user during a time interval. For example, the online system determines a ratio of an amount of revenue received from presenting advertisements to the user during a month prior to a current time to a number of impressions of advertisements to the user during the month prior to the current time. The online system determines the adjustment value by modifying the amount of revenue received by the online system per impression of advertisements to the user during the time interval by a value based on the frequency limit for the ad request, a number of impressions of the advertisement from the ad request to the user, the duration for the ad campaign, and an amount of the duration for the ad campaign that has lapsed. For example, the online system determines a number of potential impressions of the advertisement from the ad request to the user by scaling the frequency limit for the ad request by a ratio of the amount of the duration for the ad campaign that has lapsed to the duration for the ad campaign. The online system determines the adjustment value based on a ratio of the number of impressions of the advertisement from the ad request to the user to the number of potential impressions of the advertisement from the ad request to the user. In one embodiment, if the ratio of the number of impressions of the advertisement from the ad request to the user to the number of potential impressions of the advertisement from the ad request to the user is less than a threshold value (e.g., one), the adjustment value increases the bid amount associated with the ad request; conversely, if the ratio of the number of impressions of the advertisement from the ad request to the user to the number of potential impressions of the advertisement from the ad request to the user is greater than a threshold value (e.g., one), the adjustment value decreases the bid amount associated with the ad request.

Different adjustment values may be applied to the bid amount depending on whether the adjustment value increases or decreases the bid amount. For example, the adjustment value decreases the bid amount because the ratio of the number of impressions of the advertisement from the ad request to the user to the number of potential impressions of the advertisement from the ad request to the user is greater than a threshold value, the adjustment value decreases the bid amount by a greater amount than if the adjustment value increases the bid amount. As an example, if the ratio of the number of impressions of the advertisement from the ad request to the user to the number of potential impressions of the advertisement from the ad request to the user is greater than a threshold value, the adjustment value is determined via a cubic function, while if the ratio of the number of impressions of the advertisement from the ad request to the user to the number of potential impressions of the advertisement from the ad request to the user is less than the threshold value, the adjustment value is determined via a linear function. Hence, in the preceding example, the adjustment value decreases the bid amount associated with the ad request by a greater amount than the adjustment value increases the bid amount associated with the ad request.

Modifying the bid amount associated with an ad request based on a number of times an advertisement from the ad request has been presented to a user as well as a frequency limit for the ad request allows the online system to more evenly distribute impressions of the advertisement to a user throughout a specified duration while maintaining a budget for presentation of the advertisement. Determining how to adjust a bid amount associated with the ad request when an opportunity to present one or more advertisements to the user allows more accurate modification of ad request bid amounts to account for frequency limits during the specified duration. Additionally, modifying a bid amount associated with the ad request based on the number of times the advertisement from the ad request has been presented during the duration and the frequency limit for the ad request allows for more efficient computation of bid amount modification, conserving computing resources and reducing time to determine modification of the bid amount.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
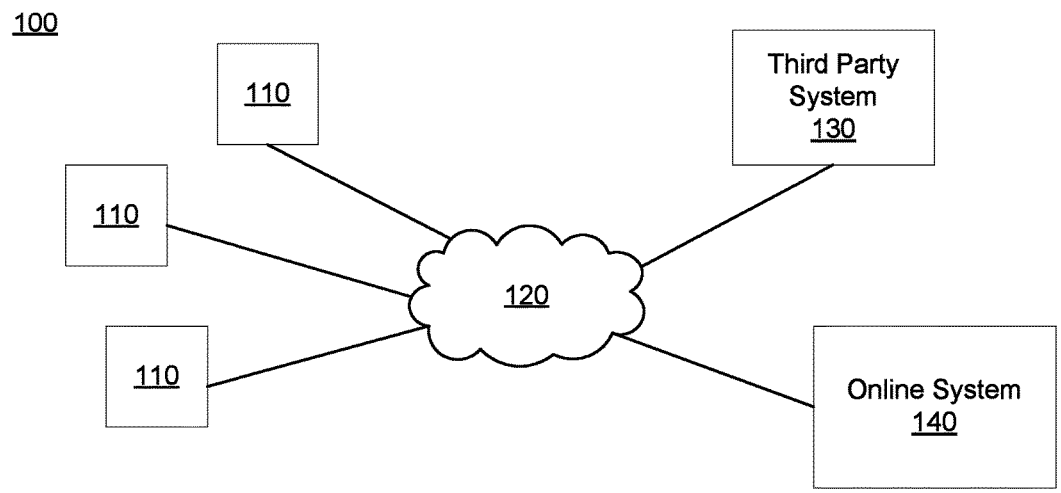
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein may be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content. For example, a third party system 130 provides advertisement requests, which are further described below in conjunction with FIG. 2, including advertisements for presentation and amounts of compensation provided by the third party system 130 to the online system 140 in exchange presenting the advertisements to the online system 140. Content presented by the online system 140 for which the online system 140 receives compensation in exchange for presenting is referred to herein as "sponsored content," "sponsored content items," or "advertisements." Sponsored content from a third party system 130 may be associated with the third party system 130 or with another entity on whose behalf the third party system 130 operates.

Figure 2:
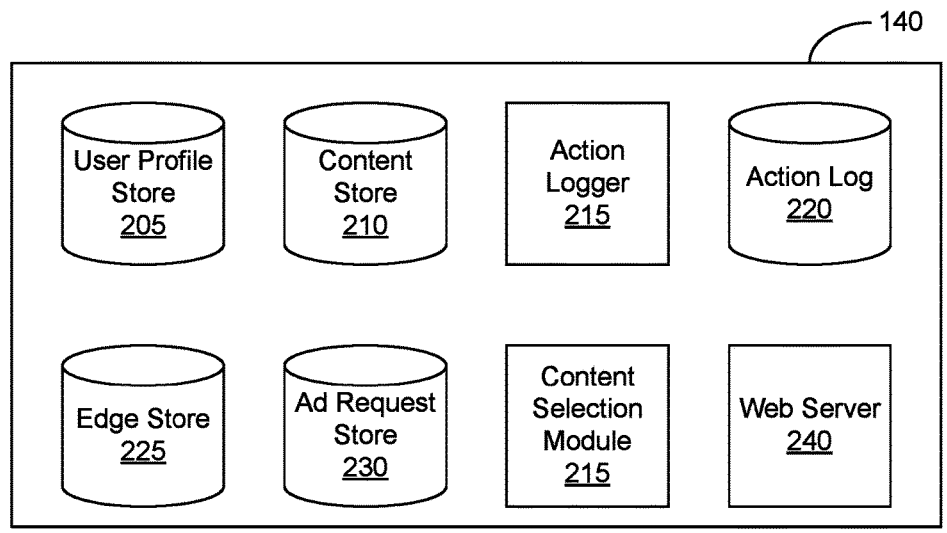
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an advertisement ("ad") request store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), engaging in a transaction, viewing an object (e.g., a content item), and sharing an object (e.g., a content item) with another user. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. In various embodiments, the ad request store 230 includes one or more advertising campaigns, each advertising campaign including one or more ad requests. Additionally, an advertising campaign is associated with one or more objectives, a duration, and a budget. An objective associated with an advertising campaign describes one or more goals for presentation of advertisements from ad requests included in the advertising campaign. For example, an objective specifies a total number of impressions of advertisements from ad requests in the advertising campaign to users during the duration included in the advertising campaign, specifies a total number of unique online system users to be presented with at least one advertisement from the advertising campaign, a maximum number of times an advertisement from an ad request in the advertising campaign is presented to a user (a "frequency limit") within the duration of the advertising campaign, or any other suitable criteria. In some embodiments, different ad requests in the advertising campaign are associated with different frequency limits, allowing advertisements from different ad requests in the ad campaign to be presented to an online system user different numbers of times within the advertising campaign's duration. The budget specifies a total amount of compensation a user (e.g., an advertiser) associated with an advertising campaign provides the online system 140 for presenting advertisements from ad requests in the advertising campaign or for the online system 140 receiving interactions with advertisements from ad requests in the advertising campaign.

Additionally, the duration associated with the advertising campaign specifies a time interval during which advertisements from ad requests in the advertising campaign are presented to social networking system users. For example, if the duration of an advertising campaign is 30 days, advertisements included in the advertising campaign are presented to online system users for 30 days after the advertising campaign is provided to the online system 140. In some embodiments, the user providing the advertising campaign may also specify a start date for the advertising campaign, so the duration is measured from the specified start date.

An advertising campaign includes one or more ad requests that each describe advertisements in the advertising campaign for presentation to one or more social networking system users. An ad request includes advertisement content, also referred to as an "advertisement," and a bid amount. The advertisement is text, image, audio, video, or any other suitable data presented to a user. The advertisement may also include a landing page specifying a network address to which a user is directed when the advertisement content is accessed. In some embodiments, the bid amount is associated with an ad request by a user providing the ad request to the online system 140 and is used to determine an expected value, such as monetary compensation, provided by the user to the online system 140 if an advertisement in the ad request is presented to another user, if the advertisement in the ad request receives an interaction from another user presented with the advertisement, or if any suitable condition is satisfied when the advertisement in the ad request is presented to another user. For example, the bid amount specifies a monetary amount that the online system 140 receives from an advertiser if an advertisement in an ad request is displayed. In some embodiments, the expected value to the online system 140 of presenting the advertisement may be determined by multiplying the bid amount by a probability of the advertisement being accessed by a user.

Alternatively, the user providing an ad request to the online system 140 does not associate a bid amount with the ad request, but the online system 140 determines a bid amount for the ad request based on a budget, a duration, or an objective associated with the advertising campaign including the ad request. For example, a pacing factor is determined from the budget associated with an advertising campaign including the ad request and an amount spent by an advertiser on the advertising campaign from a start date of the advertising campaign to a current time. The pacing factor modifies a bid amount associated with various advertisements in the ad campaign, altering spending of the advertising campaign's budget throughout the duration of the advertising campaign.

Additionally, an ad request may include one or more targeting criteria specified by the user providing the ad request to the online system 140 (e.g., an advertiser). Targeting criteria included in an ad request specify one or more characteristics of users eligible to be presented with advertisement content in the ad request. For example, targeting criteria are used to identify users having user profile information, edges, or actions satisfying at least one of the targeting criteria. Hence, targeting criteria allow a user to identify other users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows further refinement of users eligible to be presented with an advertisement from an ad request. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the online system 140 and based on the user's affinity for different content items. Information associated with the user included in the user profile store 205, in the action log 220, and in the edge store 225 may be used to determine the measures of relevance. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include advertisements from ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects advertisements from ad requests associated with a maximum expected value or associated with at least a threshold expected value for presentation. An expected value associated with an ad request or with a content item represents an expected amount of compensation to the online system 140 for presenting an advertisement from the ad request or for presenting the content item. For example, the expected value associated with an ad request is a product of the ad request's bid amount and a likelihood of the user interacting with the ad content from the ad request. The content selection module 235 may rank ad requests based on their associated bid amounts and select advertisements from ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and with ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

When selecting one or more advertisements for presentation to a user via an identified opportunity to present one or more advertisements, the content selection module 235 accounts for various characteristics of advertising campaigns including ad requests. If the content selection module 235 identifies an ad request associated with a frequency limit from an advertising campaign having a duration, the content selection module 235 modifies a bid amount associated with the identified ad request to present an advertisement from the ad request to the user throughout the duration of the advertising campaign subject to the frequency limit. To modify the bid amount associated with the identified ad request, the content selection module 235 determines a portion of the advertising campaign's duration that has lapsed and a number of impressions of the advertisement from the identified ad request to the user during the lapsed portion of the advertising campaign's duration. Based on the duration of the advertising campaign, the frequency limit associated with the identified ad request, and the lapsed portion of the duration of the advertising campaign, the content selection module 235 determines a potential number of impressions of the advertisement from the identified ad request during the lapsed portion of the duration of the advertising campaign. For example, the content selection module 235 scales the frequency limit associated with the identified ad request by a ratio of the lapsed portion of the duration of the advertising campaign to the duration of the advertising campaign to determine the potential number of impressions of the advertisement from the identified ad request.

The content selection module 235 determines an adjustment value for modifying the bid amount associated with the identified ad request based on a comparison of the impressions of the advertisement from the identified ad request to the user during the lapsed portion of the duration to the potential number of impressions of the advertisement from the identified ad request to the user during the lapsed portion of the duration. If the number of impressions exceeds the potential number of impressions, the content selection module 235 determines an adjustment value that decreases the bid amount associated with the identified ad request. However, if the number of impressions is less than the potential number of impressions, the content selection module 235 determines an adjustment value that increases the bid amount associated with the identified ad request. Determining an adjustment value based on a frequency cap associated with an ad request is further described below in conjunction with FIGS. 3 and 4. The content selection module 235 includes the identified ad request and its bid amount after modification by the adjustment value in one or more selection processes selecting one or more advertisements for presentation via the opportunity, as further described above.

For example, the content selection module 235 receives a request to present a feed of content (also referred to as a "content feed") to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user and selects content items based on the retrieved information. For example, information describing actions associated with other users connected to the user or other data associated with users connected to the user is retrieved and used to select content items describing actions associated with one or more of the other users. Additionally, one or more ad requests may be retrieved from the ad request store 230. The retrieved ad requests and other content items are analyzed by the content selection module 235 to identify candidate content items that are likely to be relevant to the user. For example, content items associated with users who not connected to the user or content items associated with users for whom the user has less than a threshold affinity are discarded as candidate content items. Based on various criteria, the content selection module 235 selects one or more of the candidate content items or ad requests identified as candidate content items for presentation to the user. The selected content items or advertisements from selected ad requests are included in a feed of content that is presented to the user. For example, the feed of content includes at least a threshold number of content items describing actions associated with users connected to the user via the online system 140.

In various embodiments, the content selection module 235 presents content to a user through a feed including a plurality of content items selected for presentation to the user. One or more advertisements may also be included in the feed. The content selection module 235 may also determine an order in which selected content items or advertisements are presented via the feed. For example, the content selection module 235 orders content items or advertisements in the feed based on likelihoods of the user interacting with various content items or advertisements.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Modifying Advertisement Request Bid Amounts Based on a Frequency Limit

Figure 3:
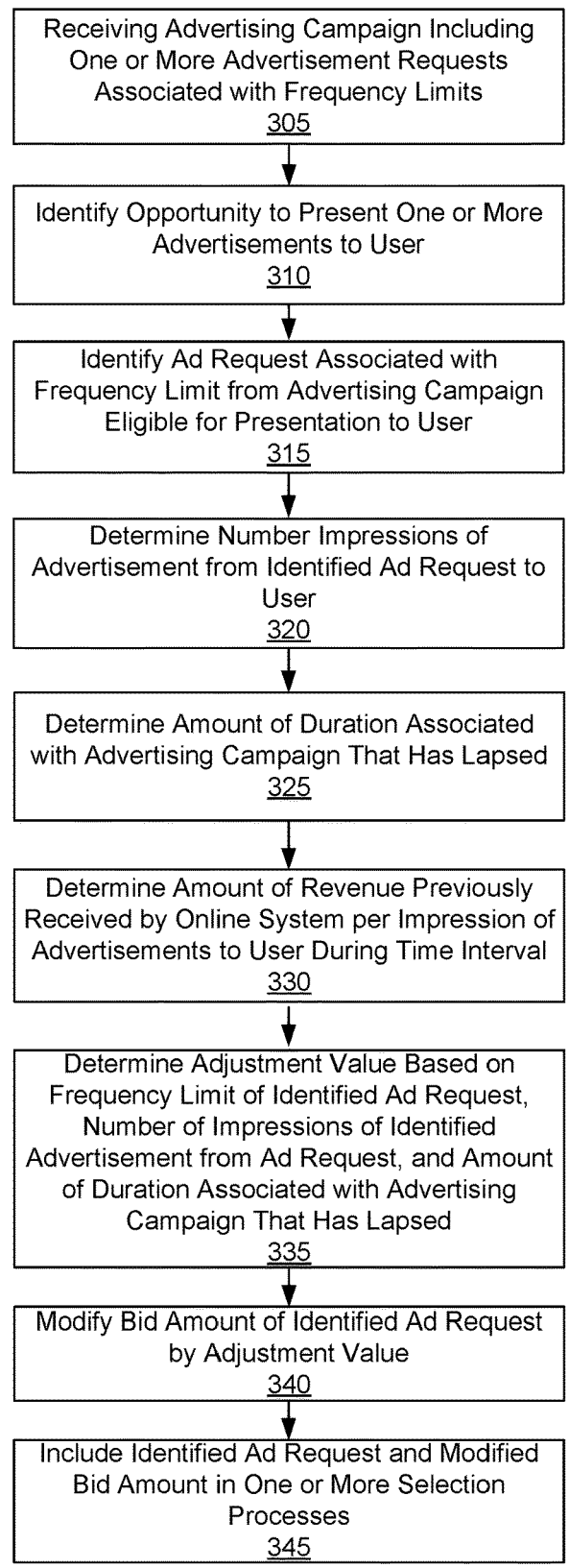
FIG. 3 is a flowchart of a method for modifying a bid amount associated with an advertisement request subject to a frequency limit and budget for presenting an advertisement from the advertisement request, in accordance with an embodiment.

FIG. 3 is a is a flowchart of one embodiment of a method for modifying a bid amount associated with an advertisement request ("ad request") subject to a frequency limit and a budget for presenting the advertisement from the advertisement request. In various embodiments, the steps described in conjunction with FIG. 3 may be performed in different orders than the order described in conjunction with FIG. 3. Additionally, the method may include different and/or additional steps than those described in conjunction with FIG. 0.3 in some embodiments.

The online system 140 receives 305 an advertising campaign including one or more advertisement requests ("ad requests"), each ad request including an advertisement for presentation to online system users. The advertising campaign is associated with a duration, one or more objectives, and a budget. As described above in conjunction with FIG.

2, the objective describes one or more goals for actions associated with presentation of advertisements from ad requests in the advertising campaign. For example, an objective specifies a total number of impressions of advertisements from ad requests in the advertising campaign to users during the duration included in the advertising campaign, specifies a total number of unique online system users to be presented with at least one advertisement from the advertising campaign, a maximum number of times an advertisement from an ad request in the advertising campaign is presented to a user (a "frequency limit") within the duration of the advertising campaign, or any other suitable criteria. In some embodiments, different ad requests in the advertising campaign are associated with different frequency limits, allowing advertisements from different ad requests in the ad campaign to be presented to an online system user different numbers of times within the advertising campaign's duration. The budget specifies a total amount of compensation a user (e.g., an advertiser) associated with the advertising campaign provides the online system 140 for presenting advertisements from ad requests in the advertising campaign or for the online system 140 receiving interactions with advertisements from ad requests in the advertising campaign. Additionally, the duration associated with the advertising campaign specifies a time interval during which advertisements from ad requests in the advertising campaign are presented to social networking system users.

When the online system 140 identifies 310 an opportunity to present one or more advertisements to a user of the online system, the online system 140 identifies 315 an ad request from the advertising campaign eligible for presentation to the user. For example, the online system 140 receives a request for one or more advertisements from a client device 110 associated with the user and identifies 315 an ad request from the ad campaign including at least a threshold number or a threshold percentage of targeting criteria satisfied by characteristics of the user. As another example, when the online system 140 receives a request for one or more advertisements from a client device 110 associated with the user, the online system 140 identifies 315 an ad request from the ad campaign that does not include targeting criteria.

The ad request identified 315 by the online system 140 is associated with a frequency limit specifying a maximum number of times an advertisement from the identified ad request is presented to the user during the duration associated with the advertising campaign. To pace presentation of the advertisement from the identified ad request throughout the duration associated with the advertising campaign including the ad request, the online system 140 modifies a bid amount associated with the identified ad request. The online system 140 determines 320 a number of times the advertisement from the identified ad request has previously been presented to the user during the duration associated with the advertising campaign. For example, the online system 140 retrieves stored information associated with the user identifying content items presented to the user and times when the content items were presented to the user; based on the retrieved information, the online system 140 determines a number of times an identifier associated with the advertisement from the identified ad request was presented to the user at times within the duration associated with the advertising campaign.

Additionally, the online system 140 determines 325 an amount of the duration associated with the advertising campaign that has lapsed when the opportunity to present one or more advertisements to the user was identified 310. For example, the online system 140 determines 325 an amount of time from when the advertising campaign was received 305 to a time when the opportunity to present one or more advertisements to the user was identified 310. As another example, the online system 140 determines 325 an amount of time between a start time specified by the advertising campaign and a time when the opportunity to present one or more advertisements to the user was identified 310.

The online system 140 also determines 330 an amount of revenue previously received by the online system 140 per impression of advertisements to the user during a time interval. For example, the online system 140 determines an amount of revenue received from presenting advertisements to the user during a month prior to a time when the opportunity to present one or more advertisements to the user was identified 310 and divides the determined amount of revenue by a number of impressions of advertisements to the user during the month prior to the time when the opportunity to present one or more advertisements to the user was identified 310. In other embodiments, the online system 140 may determine the amount of revenue previously received based on revenue received by the online system 140 for presenting advertisements to the user and a number of impressions of advertisements to the user during any suitable time interval.

Based on the frequency limit associated with the identified ad request, the amount of the duration associated with the advertising campaign that has lapsed when the opportunity to present one or more advertisements to the user was identified 310, and the number of times the advertisement from the identified ad request has been presented to the user within the duration associated with the advertising campaign, the online system 140 determines 335 an adjustment value for a bid amount associated with the identified ad request. In various embodiments, the adjustment value is determined 335 by modifying the amount of revenue previously received by the online system 140 per impression of advertisements to the user during a time interval by a value based on the frequency limit associated with the identified ad request, the amount of the duration associated with the advertising campaign that has lapsed when the opportunity to present one or more advertisements to the user was identified 310, and the number of times the advertisement from the identified ad request has been presented to the user within the duration associated with the advertising campaign, the online system 140. In one embodiment, the online system 140 determines a ratio of the amount of the duration associated with the ad campaign that has lapsed to the duration associated with the ad campaign. The online system 140 determines a number of potential impressions of the advertisement from the ad request to the user during the amount of the duration that has lapsed by scaling the frequency limit for the ad request by the determined ratio. Based on the number of potential impressions of the advertisement from the ad request to the user during the amount of the duration that has lapsed and the frequency limit for the ad request, the online system 140 determines 335 the adjustment value.

In one embodiment, the online system 140 determines a ratio of the number of impressions of the advertisement from the ad request to the user to the number of potential impressions of the advertisement from the ad request to the user during the portion of the duration that has lapsed. If the ratio of the number of impressions of the advertisement from the ad request to the user to the number of potential impressions of the advertisement from the ad request to the user during the amount of the duration that has lapsed is less than a threshold value (e.g., one), the online system 140 determines 335 the adjustment value increases the bid amount associated with the ad request based at least in part on the amount of revenue previously received by the online system 140 per impression of advertisements to the user during the time interval; conversely, if the ratio of the number of impressions of the advertisement from the ad request to the user to the number of potential impressions of the advertisement from the ad request during the amount of the duration that has lapsed is greater than a threshold value (e.g., one), the online system 140 determines 335 the adjustment value decreases the bid amount associated with the ad request by an amount based on the amount of revenue previously received by the online system 140 per impression of advertisements to the user during the time interval. In various embodiments, if the ratio of the number of impressions of the advertisement from the ad request to the user to the number of potential impressions of the advertisement from the ad request to the user during the amount of the duration that has lapsed equals the threshold value (e.g., one), the online system 140 determines 335 the adjustment value is zero, so the bid amount associated with the identified ad request is not modified, as further described below.

Hence, if the number of impressions of the advertisement from the identified ad request exceeds the number of potential impressions of the advertisement from the identified ad request during the amount of the duration that has lapsed, the online system 140 determines 335 an adjustment value that decreases the bid amount associated with the identified ad request. Conversely, if the number of impressions of the advertisement from the identified ad request is less than the number of potential impressions of the advertisement from the identified ad request during the amount of the duration that has lapsed, the online system 140 determines 335 an adjustment value that increases the bid amount associated with the identified ad request. If the number of impressions of the advertisement from the identified ad request equals the number of potential impressions of the advertisement from the identified ad request during the amount of the duration that has lapsed, the online system 140 determines 335 no adjustment value is applied to the bid amount associated with the identified ad request.

The online system 140 may differently determine 335 the adjustment value depending on whether the adjustment value increases or decreases the bid amount. For example, the online system 140 determines 335 the adjustment value as a linear function of the amount of revenue previously received by the online system 140 per impression of advertisements to the user during the time interval if the adjustment value increases the bid amount and determines 335 the adjustment value as a quadratic or a cubic function of the amount of revenue previously received by the online system 140 per impression of advertisements to the user during the time interval if the adjustment value decrease the bid amount. Hence, in the preceding example, the adjustment value decreases the bid amount associated with the ad request by a greater amount than the adjustment value increases the bid amount associated with the ad request. Alternatively, a single function of the amount of revenue previously received by the online system 140 per impression of advertisements to the user during the time interval determines 335 the adjustment value regardless of whether the adjustment value increases or decreases the bid amount.

Figure 4:
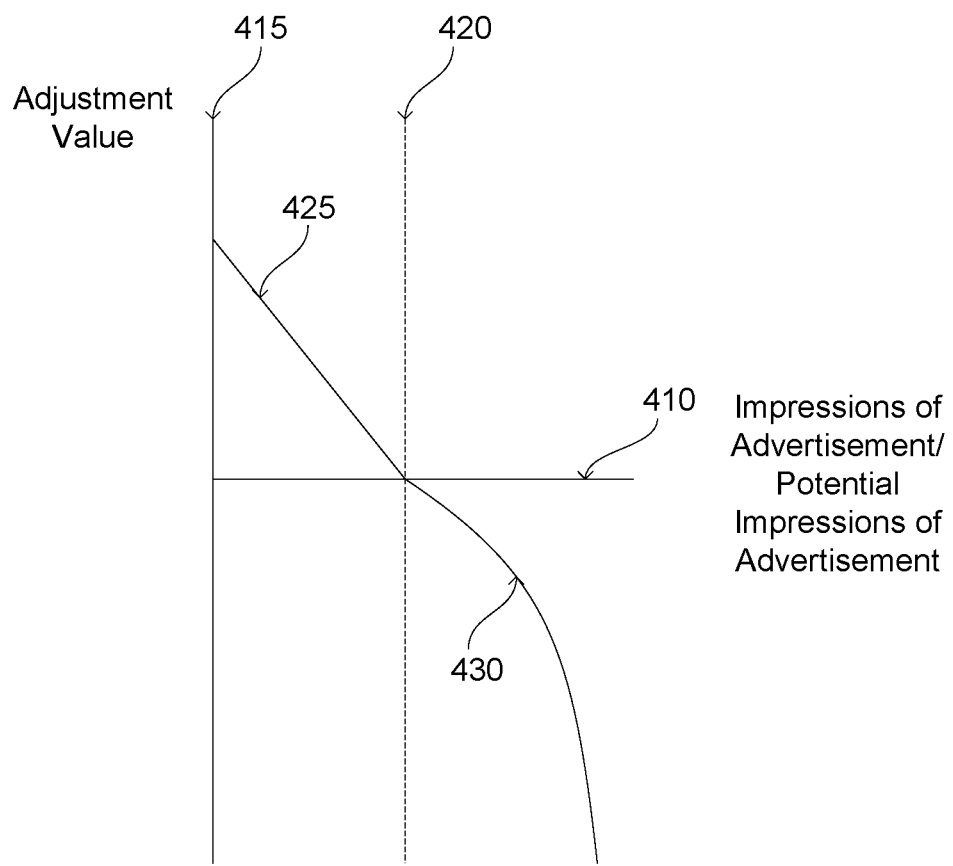
FIG. 4 is an example of determining an adjustment value for a bid amount associated with an advertisement request ("ad request") associated with a frequency limit, in accordance with an embodiment.

FIG. 4 shows an example of determining an adjustment value for a bid amount associated with an advertisement request ("ad request") associated with a frequency limit. For purposes of illustration, FIG. 4 shows a graph of ratios 410 of impressions of an advertisement from the ad request to a user to potential impressions of the advertisement from the ad request during a lapsed portion of a duration of an advertising campaign including the ad request (further described above in conjunction with FIG. 3) against adjustment values 415. As shown in FIG. 4, when the ratio of impressions of the advertisement from the ad request to the user to potential impressions of the advertisement from the ad request during the lapsed portion of a duration of an advertising campaign including the ad request equals a threshold value 420, the adjustment value is zero, so the bid amount of the ad request is not modified. For example, the threshold value 420 is one, so the adjustment value is zero when the number of impressions of the advertisement from the ad request to a user equals the number of potential impressions of the advertisement from the ad request during the lapsed portion of the duration of the advertising campaign including the ad request.

When the number of impressions of the advertisement from the ad request to the user is less than the number of potential impressions of the advertisement from the ad request during the lapsed portion of the duration of the advertising campaign including the ad request, the ratio of the number of impression to the number of potential impressions is less than the threshold value 420, so the online system 140 determines an adjustment value 415 that increases a bid amount associated with the ad request. Increasing the bid amount by the adjustment value 415 increases a likelihood of the online system 140 selecting the ad request in a selection process, which increases a likelihood of the advertisement from the ad request being presented to the user. In the example of FIG. 4, the online system 140 determines the adjustment value 415 using a linear function 425 of an amount of revenue previously received by the online system 140 from prior impressions of advertisements to the user. As shown in FIG. 4, the adjustment value 415 decreases as a difference between the impressions of the advertisement from the ad request and the number of potential impressions of the advertisement during the lapsed portion of the duration decrease.

Conversely, when the number of impressions of the advertisement from the ad request to the user is greater than the number of potential impressions of the advertisement from the ad request during the lapsed portion of the duration of the advertising campaign including the ad request, the ratio of the number of impression to the number of potential impressions is greater than the threshold value 420, so the online system 140 determines an adjustment value 415 that decreases a bid amount associated with the ad request. Decreasing the bid amount by the adjustment value 415 decreases a likelihood of the online system 140 selecting the ad request in a selection process, which slows presentation of the advertisement to the user during the duration of the advertising campaign including the ad request. The online system 140 may differently determine the adjustment value 415 when the ratio of the number of impressions to the number of potential impressions is greater than the threshold value 420 than when the ratio of the number of impression to the number of potential impressions is less than the threshold value 420. In the example of FIG. 4, the online system 140 determines the adjustment value 415 using a cubic function 430 of an amount of revenue previously received by the online system 140 from prior impressions of advertisements to the user. Using a cubic function 430 to determine the adjustment value 415 when the ratio of the number of impression to the number of potential impressions is greater than the threshold value 420 allows the online system 140 to determine adjustment values 415 that more significantly reduce the bid amount of the ad request, which more significantly decreases a likelihood of the advertisement from the ad request being presented to the user when the number of impressions of the advertisement exceeds the number of potential impressions of the advertisement. However, in other embodiments, any suitable function may be used to determine the adjustment value 415 when the ratio of the number of impression to the number of potential impressions is greater than the threshold value 420.

Referring back to FIG. 3, using the determined adjustment value, the online system 140 modifies 340 the bid amount associated with the identified ad request and includes 345 the identified ad request along with the modified bid amount in one or more selection processes that select one or more advertisements for presentation to the user via the identified opportunity. In some embodiments, the online system 140 determines the bid amount associated with the identified ad request based on the budget associated with the advertising campaign and an amount of revenue received by the online system 140 from an advertiser associated with the advertising campaign during the amount of the duration that has lapsed when the opportunity to present one or more advertisements to the user was identified 310. The online system 140 then modifies 340 the determined bid amount by the determined adjustment value. Determining a bid amount for an ad request based on a budget for an advertising campaign including the ad request is further described in U.S. patent application Ser. No. 13/294,094, filed on Nov. 10, 2011, which is hereby incorporated by reference in its entirety. In various embodiments, the online system 140 modifies 340 the bid amount associated with the identified ad request by adding the adjustment value to the bid amount associated with the identified ad request.

The one or more selection processes may select one or more advertisements for presentation to the user via the identified opportunity based at least in part on the bid amounts associated with various ad requests. For example, as further described above in conjunction with FIG. 2, a selection process determines expected values for various ad requests, including the identified ad request, based on bid amounts associated with the ad requests and likelihoods of the user interacting with advertisements included in the ad requests. The selection process ranks the ad requests based on their expected values and selects ad requests having at least a threshold position in the ranking or selects ad requests having at least a threshold expected value. Advertisements from the selected ad requests are then communicated to a client device 110 associated with the user for presentation. If the identified ad request is selected and the advertisement from the identified ad request is presented to the user, the online system 140 stores information associated with the user indicating the advertisement from the identified ad request was presented to the user and a time when the advertisement from the identified ad request was presented to the user.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at an online system, an advertising campaign associated with a budget, a duration, and including one or more advertisement requests ("ad requests"), each ad request including an advertisement and frequency limits associated with one or more of the ad requests specifying a maximum number of times an advertisement from an ad request is presented to a user during the duration;
identifying an opportunity to present one or more advertisements to a user of the online system;
identifying the ad request from the advertising campaign eligible for presentation to the user, the identified ad request associated with a frequency limit and including an advertisement;

determining a lapsed time period representing a portion of the duration of the advertising campaign that is lapsed when the opportunity was identified;

determining a number of impressions of the advertisement that occurred during the determined lapsed time period;

determining a number of potential impressions of the advertisement from the identified ad request by scaling the frequency limit associated with the identified ad request by a ratio of the lapsed time period to the duration associated with the advertising campaign;

determining a ratio of the number of impressions of the advertisement from the identified ad request to the user to the number of potential impressions of the advertisement from the identified ad request;

comparing the ratio to a predefined threshold;

determining an adjustment value for modifying a bid amount associated with the identified ad request according to a linear function of the ratio that increases the bid amount when the ratio is less than a threshold value and according to a non-linear function of the ratio that decreases the bid amount when the ratio is greater than the threshold value;

modifying the bid amount associated with the identified ad request by the adjustment value.

2. The method of claim 1 wherein determining the adjustment value comprises:

determining an amount of revenue previously received by the online system per impression of advertisements to the user during a time interval; and determining the adjustment value using the linear function based at least in part on the determined amount of revenue in response to determining the determined ratio is greater than the threshold value.

3. The method of claim 1, wherein determining the adjustment value comprises:

determining an amount of revenue previously received by the online system per impression of advertisements to the user during a time interval; and determining the adjustment value using a cubic function based at least in part on the determined amount of revenue in response to the ratio being greater than the threshold value; and determining the adjustment value using the linear function based at least in part on the determined amount of revenue in response to the ratio being less than the threshold value.

4. The method of claim 3, wherein determining the adjustment value comprises:

determining the adjustment value is zero in response to the number of impressions of the advertisement from the identified ad request equaling the number of potential impressions of the advertisement from the identified ad request.

5. The method of claim 1, further comprising:

including the identified ad request and the modified bid amount associated with the identified ad request in a selection process selecting one or more advertisements for presentation to the user via the identified opportunity based at least in part on bid amounts associated with ad requests; and presenting the advertisement from the identified ad request to the user in response to the selection process selecting the identified ad request.

6. The method of claim 1, wherein modifying the bid amount associated with the identified ad request by the adjustment value comprises:

determining the bid amount based at least in part on the budget associated with the advertising campaign and an amount of revenue received from an advertiser associated with the advertising campaign during the amount of the duration that has lapsed when the opportunity was identified; and modifying the bid amount by the adjustment value.

7. A computer program product comprising a non-transitory computer-readable storage medium having instructions encoded thereon that, when executed by a processor, cause the processor to:

receive, at an online system, an advertising campaign associated with a budget, a duration, and including one or more advertisement requests ("ad requests"), each ad request including an advertisement and frequency limits associated with one or more of the ad requests specifying a maximum number of times an advertisement from an ad request is presented to a user during the duration;

identify an opportunity to present one or more advertisements to a user of the online system;

identify the ad request from the advertising campaign eligible for presentation to the user, the identified ad request associated with a frequency limit and including an advertisement;

determine a lapsed time period representing a portion of the duration of the advertising campaign that is lapsed when the opportunity was identified;

determine a number of impressions of the advertisement that occurred during the determined lapsed time period;

determine a number of potential impressions of the advertisement from the identified ad request by scaling the frequency limit associated with the identified ad request by a ratio of the lapsed time period to the duration associated with the advertising campaign;

determining a ratio of the number of impressions of the advertisement from the identified ad request to the user to the number of potential impressions of the advertisement from the identified ad request;

compare the ratio to a predefined threshold;

determining an adjustment value for modifying a bid amount associated with the identified ad request according to a linear function of the ratio that increases the bid amount when the ratio is less than a threshold value and according to a non-linear function of the ratio that decreases the bid amount when the ratio is greater than the threshold value;

modify the bid amount associated with the identified ad request by the adjustment value.

8. The computer program product of claim 7, wherein the instructions to modify the bid amount associated with the identified ad request by the adjustment value comprise instructions that cause the processor to:

determine the bid amount based at least in part on the budget associated with the advertising campaign and an amount of revenue received from an advertiser associated with the advertising campaign during the amount of the duration that has lapsed when the opportunity was identified; and modify the bid amount by the adjustment value.

9. The computer program product of claim 7, wherein the instructions to determine the adjustment value comprise instructions that cause the processor to:

determine an amount of revenue previously received by the online system per impression of advertisements to the user during a time interval; and determine the adjustment value using the linear function based at least in part on the determined amount of revenue in response to determining the determined ratio is greater than the threshold value.

10. The computer program product of claim 7, wherein the instructions to determine the adjustment value comprise instructions that cause the processor to:
    determine an amount of revenue previously received by the online system per impression of advertisements to the user during a time interval; and
    determine the adjustment value using a cubic function based at least in part on the determined amount of revenue in response to in response to ratio being greater than the threshold value; and
    determine the adjustment value using the linear function based at least in part on the determined amount of revenue in response to the ratio being less than the threshold value.

11. The computer program product of claim 10, wherein the instructions to determine the adjustment value comprise instructions that cause the processor to:
    determine the adjustment value is zero in response to in response to the number of impressions of the advertisement from the identified ad request equaling the number of potential impressions of the advertisement from the identified ad request.

12. The computer program product of claim 7, wherein the instructions further comprise instructions that cause the processor to:
    include the identified ad request and the modified bid amount associated with the identified ad request in a selection process selecting one or more advertisements for presentation to the user via the identified opportunity based at least in part on bid amounts associated with ad requests; and
    present the advertisement from the identified ad request to the user in response to the selection process selecting the identified ad request.

* * * * *

UNITED STATES PATENT AND TRADEMARK OFFICE
CERTIFICATE OF CORRECTION

PATENT NO. : 10,176,498 B2
APPLICATION NO. : 14/986642
DATED : January 8, 2019
INVENTOR(S) : Bhalgat Page 1 of 1

It is certified that error appears in the above-identified patent and that said Letters Patent is hereby corrected as shown below:

In the Claims

Column no: 21, Line(s): 13, Claim 10: delete "in response to"

Column no: 22, Line(s): 1-2, Claim 11: delete "in response to"

Signed and Sealed this
Sixteenth Day of July, 2019

Andrei Iancu
*Director of the United States Patent and Trademark Office*